(12) United States Patent
Pechanec et al.

(10) Patent No.: US 9,262,065 B2
(45) Date of Patent: Feb. 16, 2016

(54) TIME BASED TOUCH SCREEN INPUT RECOGNITION

(75) Inventors: Jiri Pechanec, Mokra-Horakov (CZ); Pavel Macik, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 748 days.

(21) Appl. No.: 13/034,502

(22) Filed: Feb. 24, 2011

(65) Prior Publication Data

US 2012/0218190 A1    Aug. 30, 2012

(51) Int. Cl.
*G06F 3/0488* (2013.01)
(52) U.S. Cl.
CPC .................................. *G06F 3/0488* (2013.01)
(58) Field of Classification Search
CPC ................................................... G06F 3/0488
See application file for complete search history.

(56) References Cited

U.S. PATENT DOCUMENTS

| | | | | |
|---|---|---|---|---|
| 5,812,805 | A * | 9/1998 | Kitayama et al. | 715/840 |
| 5,818,428 | A * | 10/1998 | Eisenbrandt et al. | 345/173 |
| 2007/0177803 | A1* | 8/2007 | Elias et al. | 382/188 |
| 2008/0174564 | A1* | 7/2008 | Kim et al. | 345/173 |
| 2008/0204427 | A1* | 8/2008 | Heesemans et al. | 345/174 |
| 2008/0295015 | A1* | 11/2008 | Liu et al. | 715/772 |
| 2009/0295720 | A1 | 12/2009 | Tseng et al. | |
| 2011/0291930 | A1* | 12/2011 | Wang | 345/163 |
| 2011/0302518 | A1* | 12/2011 | Zhang | 715/773 |
| 2013/0120279 | A1* | 5/2013 | Plichta et al. | 345/173 |

* cited by examiner

*Primary Examiner* — Grant Sitta
*Assistant Examiner* — Mihir Rayan
(74) *Attorney, Agent, or Firm* — Lowenstein Sandler LLP (57) ABSTRACT

A time based touch screen input recognition system detects a touch on a touch screen display. The system determines a length of the touch and identifies a function corresponding to the length of touch. The system causes a processing device to implement the corresponding function.

17 Claims, 8 Drawing Sheets

Fig. 1

| Time Period | Function |
|---|---|
| 0.0 – 0.5 s | Left click |
| 0.5 – 1.0 s | Center click |
| 1.0 – 1.5 s | Right click |
| 1.5 – 2.0 s | Copy |
| 2.0 – 3.0 s | Paste |
| 3.0 s | End |

Fig. 7

TIME BASED TOUCH SCREEN INPUT RECOGNITION

TECHNICAL FIELD

This disclosure relates to the field of user interface devices and, in particular, to time based touch screen input recognition.

BACKGROUND

A computer mouse and a touch screen are two examples of Human Interface Device (HID) technology that enable a user to interact with a computing device. With a computer mouse, the user indirectly controls a cursor, visible on a display, by moving the mouse and pressing/releasing one or more mouse buttons. With a touch screen, the user does not control a cursor, but rather interacts with the computing device directly simply by touching and dragging his finger over the touch screen and the cursor is moved to the location of the touch.

Conventional computer mouse devices have one or more buttons that perform specific functions when they are pressed or released. Certain computer mouse devices may have at least three basic buttons (e.g., left, center, and right). Each button has a specific function in computer user interfaces (such as an operating system's desktop, computer application programs, application control components, etc.).

Current touch screens attempt to mimic the buttons of a computer mouse through variations on the touch (i.e., tap) of the screen. For example, in certain devices, a single tap or touch of the touch screen performs the function of a left mouse button click. However, since the touch screen lacks the buttons of a computer mouse, current devices implementing a touch screen have no way to perform additional functions (e.g., those of a center or right click) without resorting to complex menu selections. It takes the user additional time to navigate these menus, decreasing the user's efficiency and resulting in an undesirable user experience.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for time based touch screen input recognition. In one embodiment, a system detects a touch on a touch screen display. The system determines a length of the touch and, optionally, a time period corresponding to the length of the touch. The system further identifies a function corresponding to the length of the touch, or time period, and causes a processing device in the system to implement the function. For example, if the length of the touch corresponds to a first time period, the system may perform a first function. However, if the length of the touch corresponds to a second time period, the system may perform a second function. The length of the time periods and the corresponding functions may be configurable by the user. The system may also display, on the touch screen display, an indication of a function corresponding to a current time period. The system may update the displayed indication to indicate a function corresponding to a subsequent time period so a user can tell when to end the touch and cause the desired function to be performed.

Figure 1:
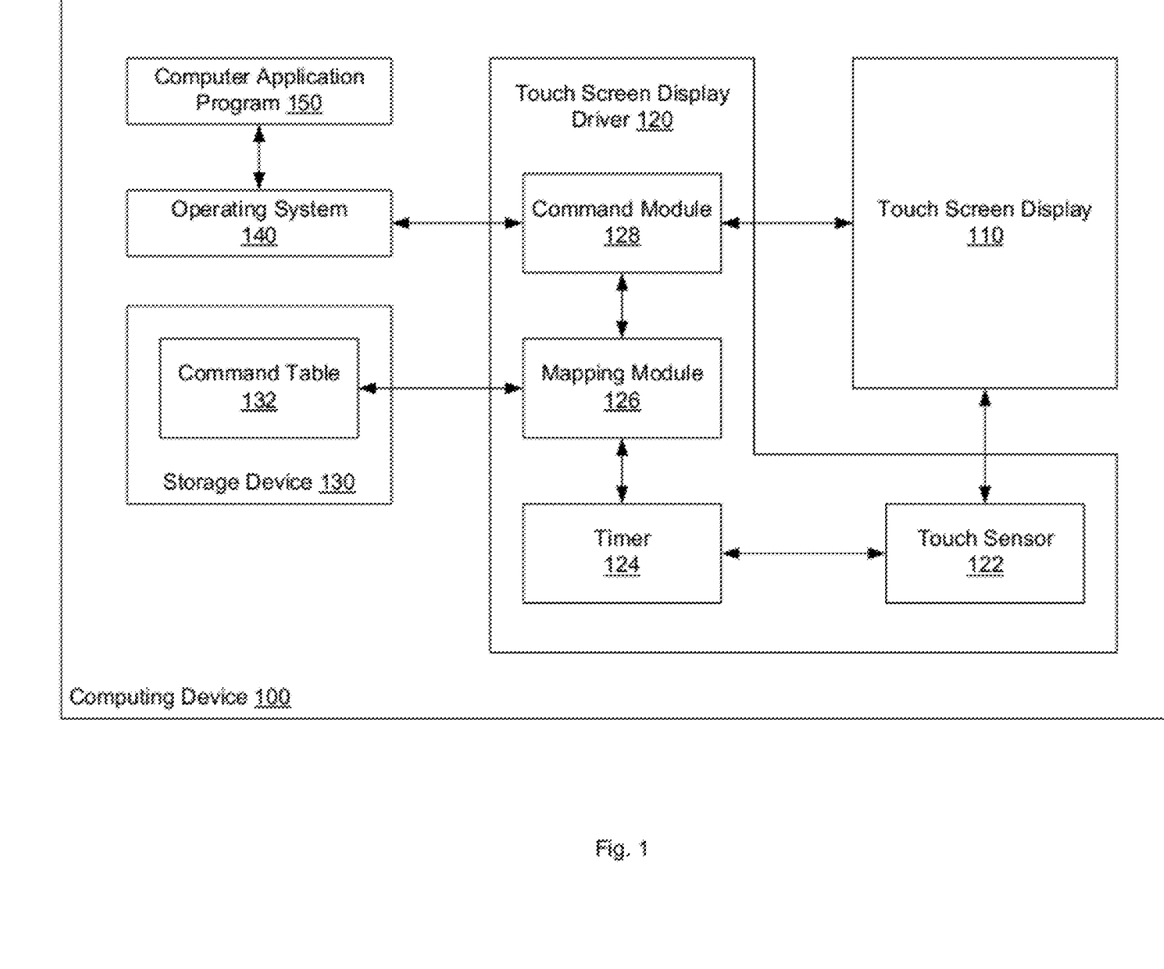
FIG. 1 is a block diagram illustrating a computing device for implementing time based touch screen input recognition, according to an embodiment.

FIG. 1 is a block diagram illustrating a computing device for implementing time based touch screen input recognition, according to an embodiment of the present invention. In one embodiment, computing device 100 includes touch screen display 110. A user may interact with computing device 100 through touch screen display 110. In one embodiment, touch screen display 110 may be a capacitive-sensing touch screen configured to display GUIs generated by computing device 100 and to detect input from a change in capacitance due to the proximity of a conductive object. The conductive object may be, for example, a user's finger, a stylus made from conductive materials, or other conductive object. In other embodiments touch screen display 110 may include a touch screen using other technologies, such as for example, a resistive touch screen, a surface acoustic wave touch screen, an infrared touch screen, an optical imaging touch screen, an acoustic pulse recognition touch screen, or other type of touch screen. In still other embodiments, a touch panel, implementing any of the above technologies and a separate display device may be used. Regardless of the technology used, touch screen display 110 provides the ability to detect a touch from a user's finger or other object, as a means of user input for computing device 100.

In one embodiment, the operation of touch screen display 110 may be controlled by touch screen display driver 120. Touch screen display driver 120 controls what is displayed on touch screen display 110 and processes the user input received through touch screen display 110. In one embodiment, touch screen display driver 120 includes touch sensor 122. Touch sensor 122 may be tailored to the particular technology used in touch screen display 110 and may detect a touch on touch screen display 110. For example, if touch screen display 110 is a capacitive touch screen, touch sensor 122 may include a capacitive sensor to detect a change in capacitance attributable to the user's finger. Similarly, if touch screen display 110 is a resistive touch screen, touch sensor 122 may include a resistive sensor to detect a change in the electrical current. In some embodiments, touch sensor 122 may be configured to detect a location of the touch on touch screen display 110.

Touch screen display driver 120 may also include a timer 124. Timer 124 may be, for example, a digital counter that either increments or decrements at a fixed frequency. In other embodiments timer 124 may include a mechanical timer, an electronic timer, or other type of timer. Timer 124 may receive a signal from touch sensor 122 when a touch is detected on touch screen display 110. In one embodiment, touch sensor 122 may send a signal to timer 124 when a touch is first detected, causing timer 124 to start. The timer may, for example, start at a value of zero and begin incrementing upon receiving the signal. Timer 124 may include comparison logic, to compare the timer value against one or more preset values, and trigger some action when the timer value matches each of the preset values. In one embodiment, the preset values include the defined time periods for various input commands. These preset values may include default values or user defined values input to computing device 100 through a user interface presented on touch screen display 110. When timer 124 reaches the value corresponding to a defined time period, timer 124 may send a message to mapping module 126, indicating which time period has been reached. Touch sensor 122 may send another signal to timer 124 when the object is removed from touch screen display 110 (signaling the end of the touch). This second signal may cause timer 124 to stop increasing the timer value. Timer 124 may be configured to send a signal to mapping module 126 indicating the timer value when the timer was stopped.

Mapping module 126 may be configured to map a particular function to each of the defined time periods. The various functions may also be user configurable from the same or a different user interface as is used to define the time period values. In one embodiment, the functions may include those typically input using a computer mouse (e.g., left click, center click, right click) or other computer functions (e.g., cut, copy, paste). These functions are merely examples, and one of skill in the art would understand that virtually any computer function may be implemented using the techniques described herein. When mapping module 126 receives a message or other indication from timer 124 that a particular time period has been reached, mapping module 126 may read command table 132, which stores the time period values and corresponding functions or commands, or otherwise determine the function corresponding to the particular time period. Command table 132 may be stored in data storage device 130. Data storage device 130 may include mass storage devices which can include, for example, flash memory, magnetic or optical disks, or tape drives, read-only memory (ROM), random-access memory (RAM), erasable programmable memory (e.g., EPROM and EEPROM), flash memory; or any other type of storage medium. The commands in command table 132 may be stored individually in memory spaces (e.g., individual files or other data structures) corresponding to each time period, or may be stored together in a single memory space in the form of a table or other data structure. One example of command table 132 is illustrated in FIG. 2.

Mapping module 126 may determine the function corresponding to the time period and pass that information to command module 128. Command module 128 may perform one of two actions. If the message received from mapping module 126 indicates that timer 124 reached a time value corresponding to a particular function (as determined by mapping module 126) during a touch (i.e., before the user's finger was removed from touch screen display 110 as determined by touch sensor 122), command module 128 may cause an indication of the corresponding function to be displayed on touch screen display 110. This indication makes the user aware of the function he will select if he ends the touch (i.e., removes his finger) at that point in time. However, if the message received from mapping module 126 indicates that the user ended the touch, thus selecting the function corresponding to the current time period (as measured by timer 124), command module 128 may provide an event message to an operating system 140 running on computing device 100. The event message may indicate that the user selected a particular function or command based on the length of the touch. Depending on the nature of the command, operating system 140 may take a corresponding action or provide an indication of the command to a computer application program 150, which performs one or more computer implemented functions, and is also running on computing device 100. Computer application program 150 may implement the functionality of a word processing program, spreadsheet program, email program, chat program, web browser or other program. In other embodiments, command module 128 may provide the event message directly to computer application program 150.

Figure 2:
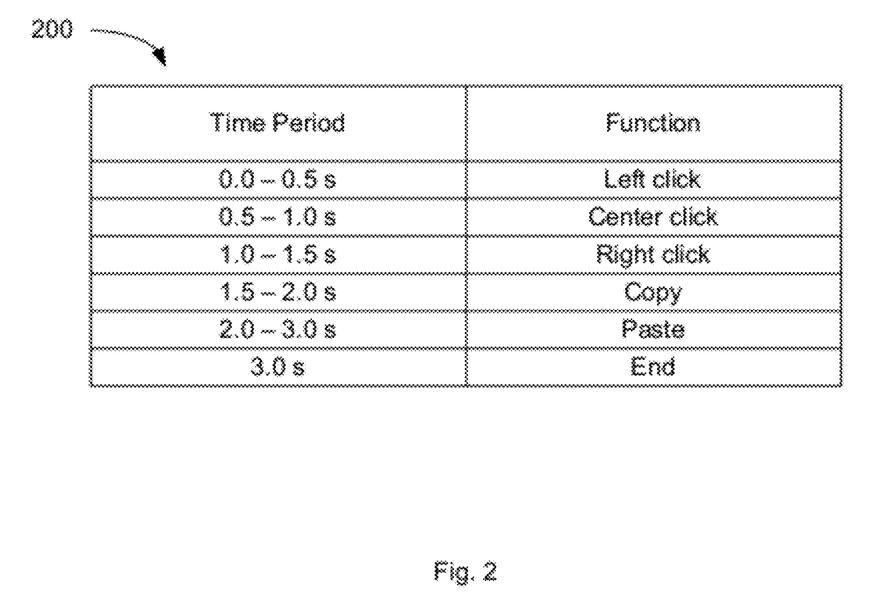
FIG. 2 is a block diagram illustrating a command table for mapping time periods to computer functions, according to an embodiment.

FIG. 2 is a block diagram illustrating a command table for mapping time periods to computer functions, according to an embodiment. Table 200 may be one example of the command table 132 shown in FIG. 1. Table 200 includes a first column identifying a number of different time periods. Each time period may include a beginning and ending value and be representative of the length of time that a user leaves his finger on touch screen display 110 (i.e., the length of the touch). The number and length of the time periods may be predetermined values (e.g., default values) or may be configurable by the user through a user interface, such as the user interface shown in FIG. 3.

Table 200 also includes a second column identifying a function or command corresponding to each of time periods in the first column. In one embodiment, upon receiving an indication of the length of a touch, mapping module 126 reads table 200 to determine the corresponding function for the particular time period. The functions in the second column may be predetermined functions or may be configurable by the user through a user interface, such as the user interface shown in FIG. 3.

Figure 3:
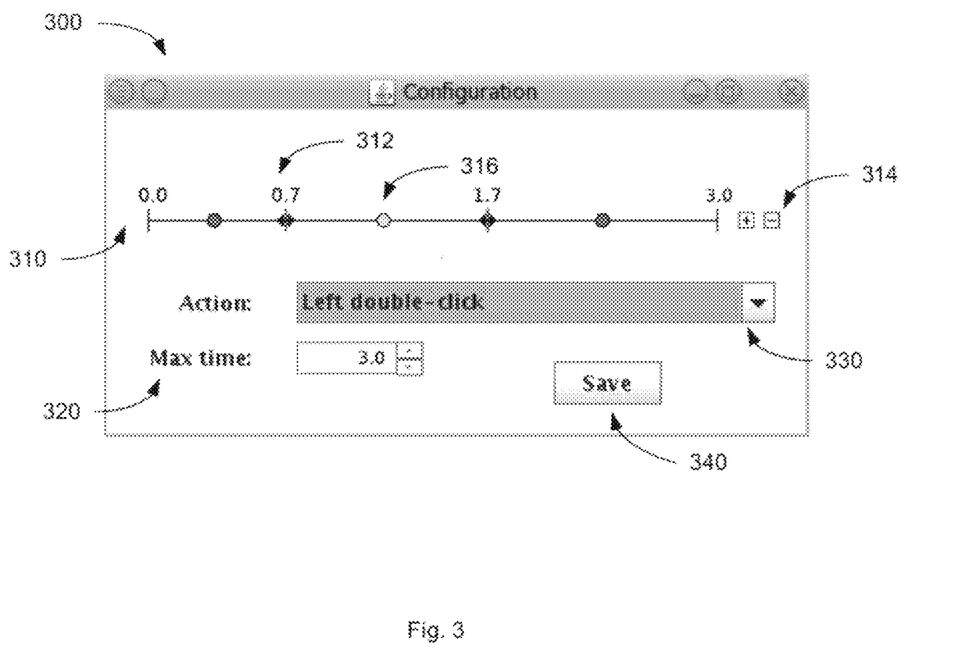
FIG. 3 is diagram illustrating a user interface for configuration of time based touch screen input recognition, according to an embodiment.

FIG. 3 is diagram illustrating an exemplary user interface for configuration of time based touch screen input recognition, according to an embodiment. The user interface may include configuration window 300, which may be displayed to the user on touch screen display 110 automatically upon boot up of computing device 100, at the request of a user to view system configuration options, or upon the occurrence of an event, such as for example, a certain number of consecutive touches of touch screen display 110. In one embodiment, configuration window 300 displays a number of configuration options from which the user may make a selection. In this embodiment, configuration window 300 displays a slider bar 310 used to represent the various time periods, such as the time periods in the first column of table 200. Slider bar 310 may represent a time having a start time (e.g., 0.0 seconds) and an end time (e.g., 3.0 seconds). The end time, or maximum time, may be configurable by max time control 320.

Slider bar 310 may include a number of time period markers 312. These time period markers 312 may be adjustable by the user to indicate the boundaries of a particular time period. In one embodiment there may be a default number of time periods (e.g., three) having default boundaries (e.g., 0.0-0.7 s, 0.7-1.7 s, 1.7-3.0 s), however, these may be configurable by the user. The user may also add or remove time period markers through "+" and "−" controls 314. The function or command corresponding to each time period is also configurable using configuration window 300. The user may select one of function indicators 316 on slider bar 310. The function indicator 316 may correspond to a particular time period (e.g., 0.7-1.7 s) and the selected function indicator 316 may be highlighted. With action control 330, the user may select a function from a pull-down menu that will be mapped the corresponding time period. Selection of a function may cause the function to be stored in the second column of table 200. Upon completion of the configuration, the user may select the save command 340 to exit configuration window 300.

Figure 4:
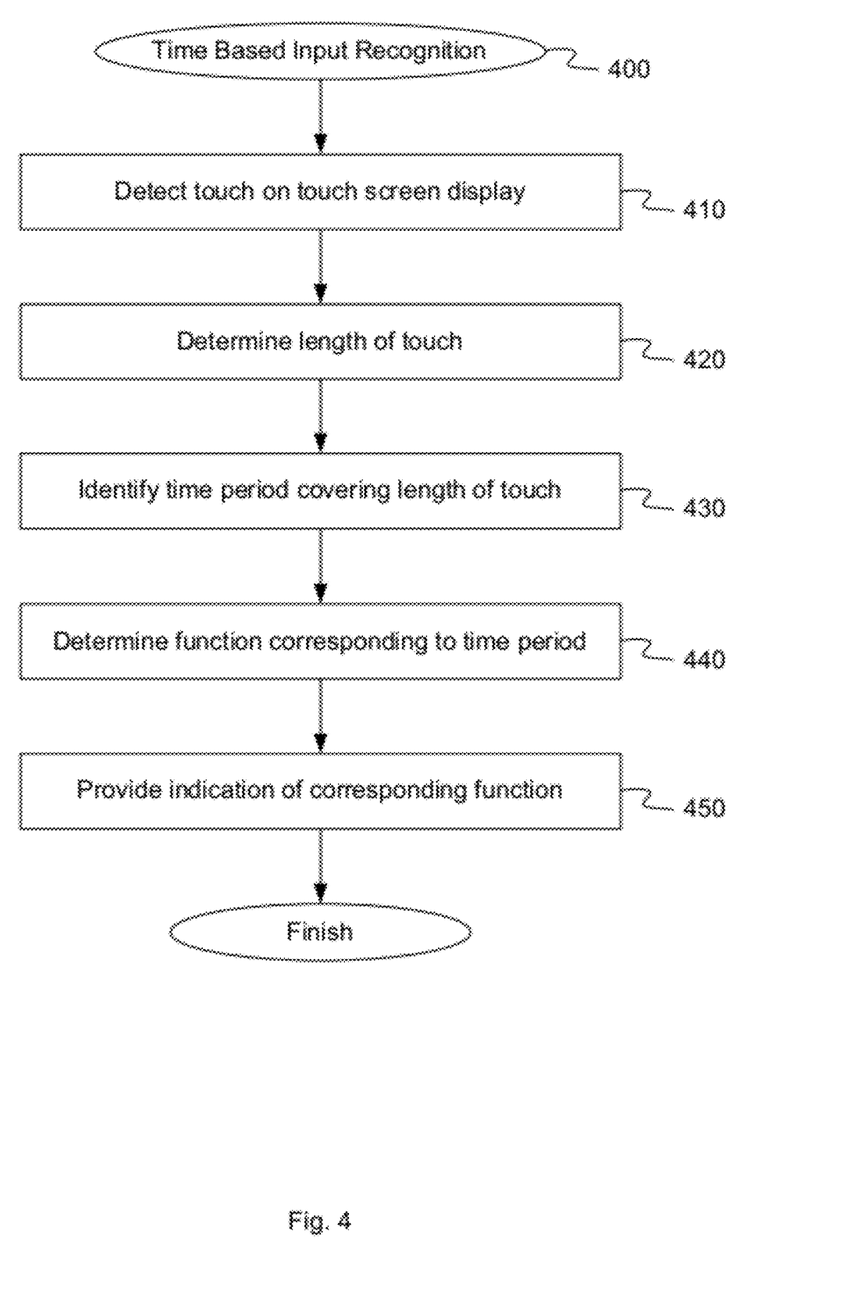
FIG. 4 is a flow diagram illustrating a time based touch screen input recognition method, according to an embodiment.

FIG. 4 is a flow diagram illustrating a time based touch screen input recognition method, according to an embodiment. The method 400 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to provide method for time based touch screen input recognition to allow a user to enter a number of commands via a single touch on a touch screen display. In one embodiment, method 400 may be performed by computing device 100, as shown in FIG. 1.

Referring to FIG. 4, at block 410, method 400 detects a touch on the surface of a touch screen display, such as touch screen display 110. The touch may be made by a user's finger or other object (e.g., a stylus). Touch sensor 122 may detect the touch using sensing methods known to one of ordinary skill in the art. At block 420, method 400 determines the length of the touch. In one embodiment, touch sensor 122 provides a signal to timer 124 when the touch is first detected. Timer 124 increments or decrements a timer value until it receives another signal from touch sensor 122 indicating that the touch is ended. Timer 124 may stop the timer value upon receiving this second signal.

At block 430, method 400 identifies a time period covering the length of the touch. Mapping module 126 may receive a signal from timer 124 indicating the length of the touch, and mapping module 126 may consult a command table 132 to identify the time period. Command table 132 (or table 200) may include a number of time periods defined by a start time and an end time. Mapping module 126 may determine which of the time periods the length of the touch falls into. At block 440, method 400 determines a function corresponding to the time period. Command table 132 may also include a function or command that is mapped to each time period. Mapping module 126 may read the corresponding command from command table 132. Alternatively, each length of the touch corresponds to a specific function and method 400 determines a function corresponding to the length of the touch without performing block 430. At block 450, method 400 provides an indication of the corresponding function. Mapping module 126 may send a message to command module 128, which may in turn send an event message to an operating system 140 indicating a command event. Operating system 140 may then take action corresponding to the command event.

FIGS. 5A-5D are diagrams illustrating exemplary user interfaces for indicating a time based input command, according to an embodiment. In some embodiments, an indication of how long a touch has lasted and what the corresponding command is at the particular point in time are displayed, so that the user can remove his finger (ending the touch) at the right time to enter the desired command. The interfaces may be displayed on touch screen display device 110 during the touch, adjacent to the location of the touch or in some other location on the display, such as in one corner. The interfaces may appear at the start of the touch, or after a certain period of time, and may be displayed for the duration of the touch, until the touch is ended. There are potentially any number of ways to provide this indication, however, FIGS. 5A-5D illustrate several possible embodiments.

Figure 5A:
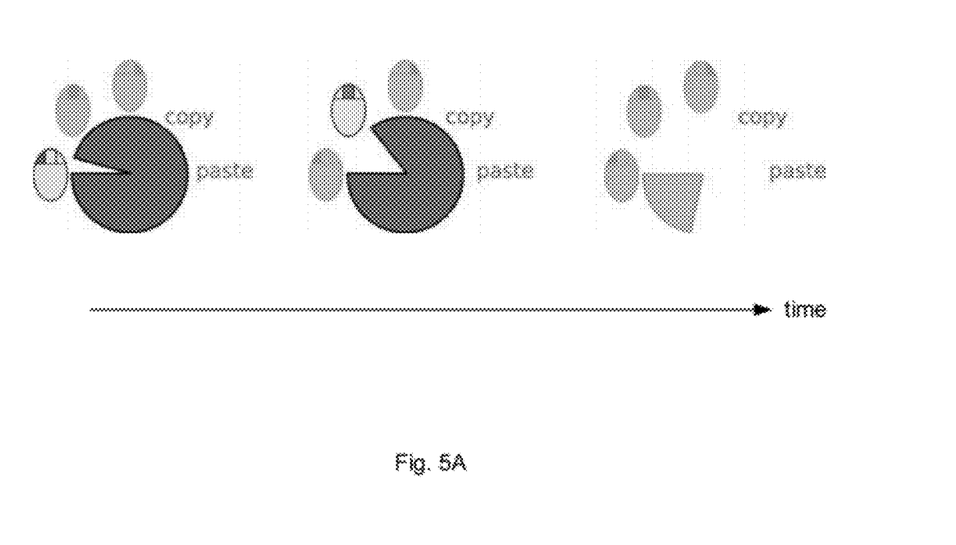
FIGS. 5A-5D are diagrams illustrating user interfaces for indicating a time based input command, according to an embodiment.

FIG. 5A shows a pie chart that is initially completely filled in, but that slowly decreases in size (i.e., has a lesser percentage filled in) over time. The portion that remains filled in may correspond to one or more commands, which are also displayed, so that the user can tell when to remove his finger, ending the touch and selecting the desired command. If the pie chart reaches a point where there are no longer any commands, or when it no longer filled in at all, the input detection method may end, resulting in no command being entered.

Figure 5B:
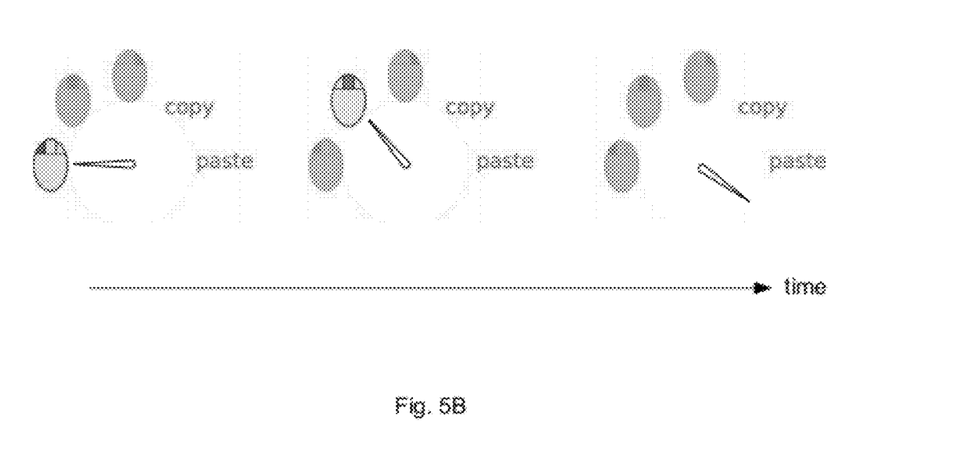

FIG. 5B shows a needle, similar to automobile speedometer or other gauge, that rotates over time pointing to different icons representing various commands or functions. In one embodiment, the icon that the needle is pointing to may be highlighted, while the other icons are grayed out, for example. The user may remove his finger, ending the touch, when the needle is pointing to the desired command, causing the command to be performed by the system.

Figure 5C:
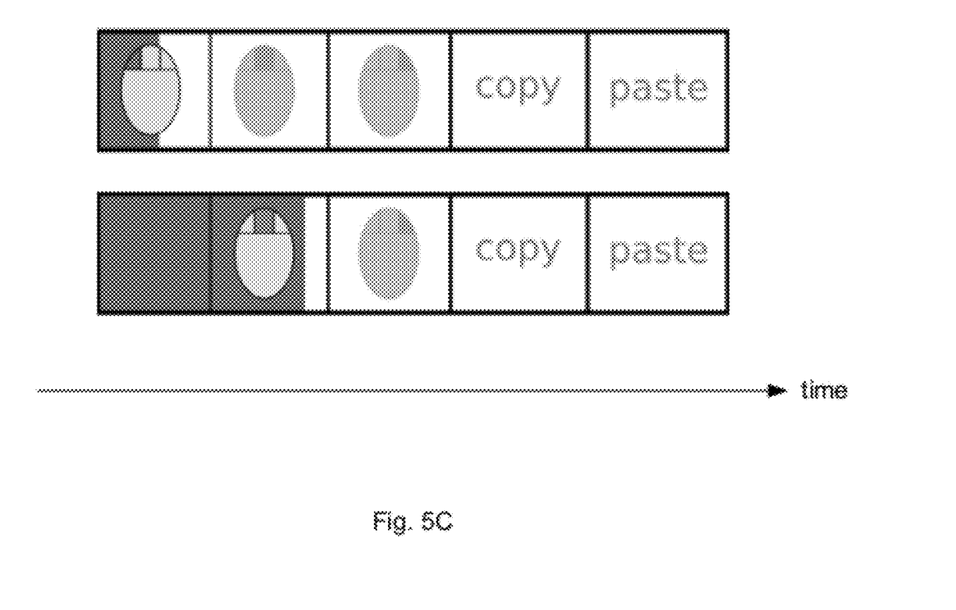

FIG. 5C illustrates a progress bar divided into multiple sections, where each section includes an indication of a corresponding command. Over time, the bar may fill in (e.g., from left to right). The amount of the progress bar that is filled in or highlighted may correspond to one of the commands. The user may remove his finger when the progress bar is filled to a level where the icon or indication for the desired command is displayed, allowing the user to select that corresponding command.

Figure 5D:
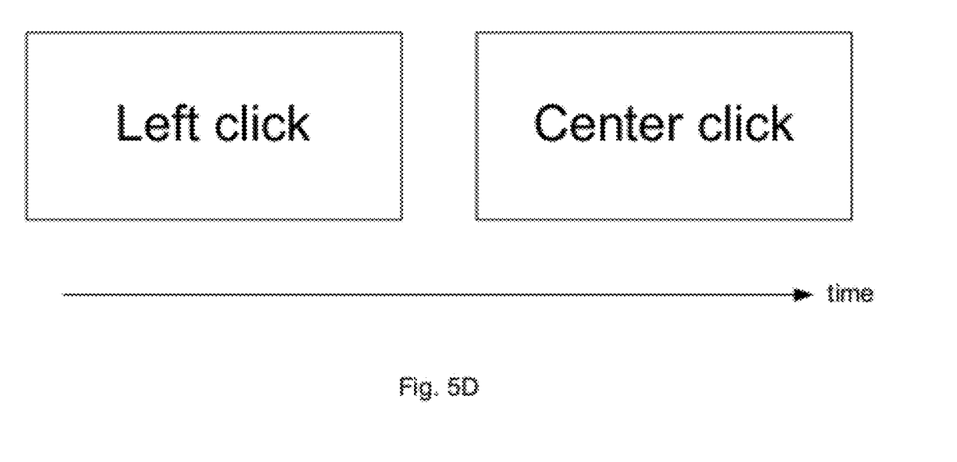

FIG. 5D illustrates a text window that may display an indication of the command that would be currently selected if the touch were ended. Over time, the text window may be updated to display other commands corresponding to subsequent time periods. If the user removes his finger at a certain point in time, the command indicated in the text window may be entered and performed by the system.

Figure 6:
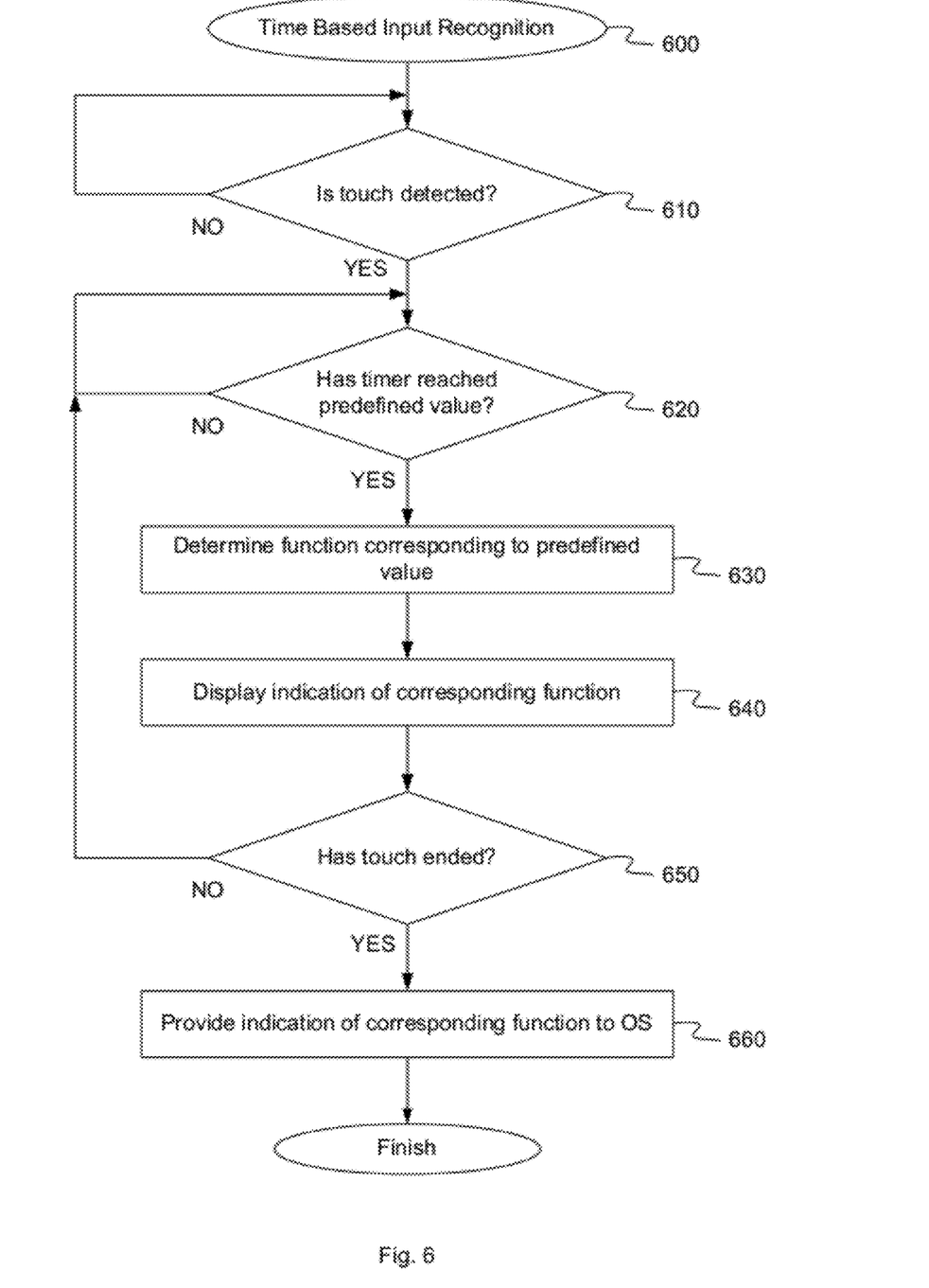
FIG. 6 is a flow diagram illustrating a time based touch screen input recognition method, according to an embodiment.

FIG. 6 is a flow diagram illustrating a time based touch screen input recognition method, according to an embodiment. The method 600 may provide for time based touch screen input recognition to allow a user to enter a number of commands via a single touch on a touch screen display. In one embodiment, method 600 may be performed by computing device 100, as shown in FIG. 1.

Referring to FIG. 6, at block 610, method 600 determines if a touch has been detected. As discussed above, touch sensor 122 may detect a touch on touch screen display 110. If no touch is detected at block 610, method 600 may continue to wait for a touch to be detected. If at block 610, method 600 detects a touch (e.g., from a user's finger), method 620 determines if a timer has reached a predefined value. The timer, such as timer 124, may begin when the touch is first detected. The predefined values may represent the boundaries of time periods corresponding to different commands, such as those in table 200. If a predefined value has not been reached, method 600 may continue to wait until timer 124 reaches one of the boundaries. If at block 620, method 600 determines that a predefined value has been reached, at block 630, method 600 determines a function corresponding to the time period for the predefined value. Mapping module 126 may consult a command table 132 to identify a function corresponding to the current time period.

At block 640, method 600 displays an indication of the corresponding function. Mapping module 126 may send a signal to command module 128 indicating the function for the current time period. Command module 128 may render and display a user interface, such as one of those shown in FIGS. 5A-5D, on touch screen display 110. This interface allows the user to know what command will be selected if the user removes his finger, ending the touch, at that point in time.

At block 650, method 600 determines whether the touch has ended. Touch sensor 122 may determine when the touch ends and provide a signal which is propagated (e.g., through timer 124 and mapping module 126) up to command module 128. If the touch has not ended (i.e., the user's finger is still on the touch screen), method 600 determines if timer 124 has reached a subsequent predefined value, at block 620. If so, method 600 may repeat the steps in blocks 630-650 for additional functions corresponding to additional time periods. If at block 650, method 600 determines that the touch has ended, at block 660, method 600 provides an indication of the current function to the operating system, such as operating system 140. Operating system 140 may then take action corresponding to the current function.

Figure 7:
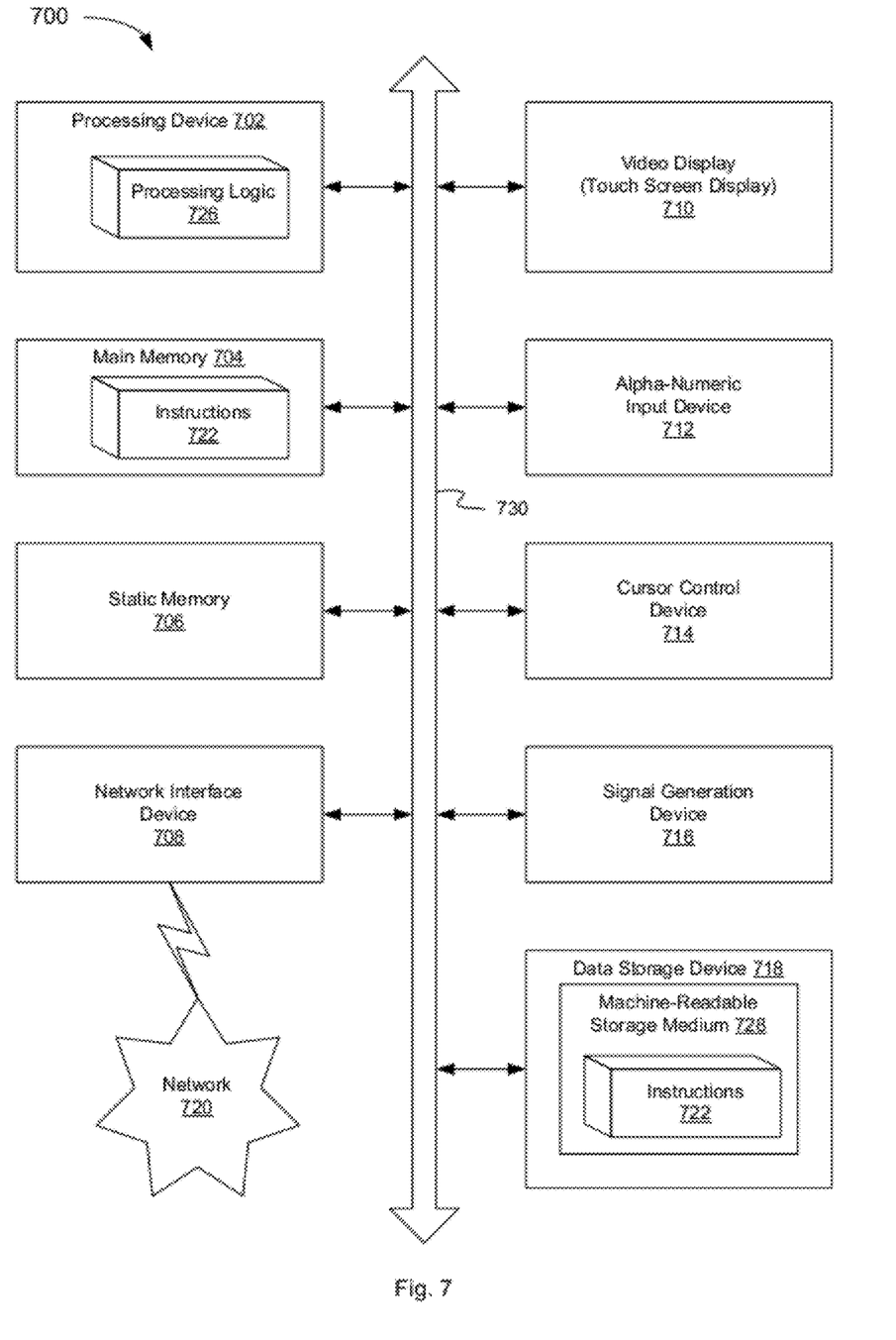
FIG. 7 is a block diagram illustrating one embodiment of a computer system for implementing time based touch screen input recognition, according to an embodiment.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker). In one embodiment, video display unit 710 is a touch screen display device, such as touch screen display 110 described above with respect to FIG. 1.

The data storage device 718 may include a machine-accessible storage medium 728, on which is stored one or more set of instructions 722 (e.g., software) embodying any one or more of the methodologies of functions described herein. The instructions 722 may also reside, completely or at least partially, within the main memory 704 and/or within the processing device 702 during execution thereof by the computer system 700; the main memory 704 and the processing device 702 also constituting machine-accessible storage media. The instructions 722 may further be transmitted or received over a network 720 via the network interface device 708.

The machine-readable storage medium 728 may also be used to store instructions to perform a method for time based touch screen input recognition, and/or a software library containing methods that call the above applications. While the machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
   detecting, by a processing device, a touch on a touch screen display;
   receiving a first signal indicating a start of the touch;
   starting a timer in response to the first signal;
   monitoring a length of the touch as the touch continues;
   determining a current time period covering the length of the touch using a current value of the timer, the current time period comprising one of a plurality of time periods, wherein each of the plurality of time periods corresponds to one of a plurality of functions;
   identifying, by the processing device, a current function, of the plurality of functions, corresponding to the current time period, wherein a number of the plurality of time periods, lengths of the plurality of time periods, the plurality of functions, and which of the plurality of functions corresponds to each of the plurality of time periods are customizable through a user interface provided on the touch screen display; and receiving a second signal indicating an end of the touch;

stopping the timer at a final value in response to the second signal;

determining a final time period using the final value of the timer;

identifying a final function, of the plurality of functions, corresponding to the final time period; and causing the processing device to implement the final function.

2. The method of claim 1, wherein monitoring the length of the touch comprises measuring, by the timer, a period of time between the start of the touch and the end of the touch.

3. The method of claim 1, further comprising:
wherein determining the current time period and the final time period comprises utilizing a command table storing one or more time period values corresponding to the plurality of time periods.

4. The method of claim 3, wherein identifying a function corresponding to the length of the touch comprises utilizing the command table storing one or more functions corresponding to the one or more time period values.

5. The method of claim 1, further comprising:
displaying, on the touch screen display, an indication of the current function corresponding to the current time period, wherein the current time period comprises a time between the start of the touch and the current time.

6. The method of claim 5, further comprising:
updating the displayed indication to indicate a function corresponding to a subsequent time period when the time between the start of the touch and the current time reaches the subsequent time period.

7. A system comprising:
a memory to store a touch screen display driver; and
a processing device operatively coupled to the memory, the processing device to execute the touch screen display driver to:
detect a touch on a touch screen display;
receive a first signal indicating a start of the touch;
start a timer in response to the first signal;
monitor a length of the touch as the touch continues;
determine a current time period covering the length of the touch using a current value of the timer, the current time period comprising one of a plurality of time periods, wherein each of the plurality of time periods corresponds to one of a plurality of functions;
identify a current function, of the plurality of functions, corresponding to the current time period, wherein a number of the plurality of time periods, lengths of the plurality of time periods, the plurality of functions, and which of the plurality of functions corresponds to each of the plurality of time periods are customizable through a user interface provided on the touch screen display;
receive a second signal indicating an end of the touch;
stop the timer at a final value in response to the second signal;
determine a final time period using the final value of the timer;
identify a final function, of the plurality of functions, corresponding to the final time period; and
cause the processing device to implement the final function.

8. The system of claim 7, wherein the processing device, monitors the length of the touch by measuring a period of time between the start of the touch and the end of the touch.

9. The system of claim 7, wherein the processing device to utilize a command table storing one or more time period values to determine the current time period and the final time period, wherein identifying a function corresponding to the length of the touch comprises utilizing the command table storing one or more functions corresponding to the one or more time period values corresponding to the plurality of time periods.

10. The system of claim 7, wherein the processing device is further to display, on the touch screen display, an indication of the current function corresponding to the current time period, wherein the current time period comprises a time between the start of the touch and the current time.

11. The system of claim 10, wherein the processing device is further to update the displayed indication to indicate a function corresponding to a subsequent time period when the time between the start of the touch and the current time reaches the subsequent time period.

12. A non-transitory machine readable storage medium storing instructions which when executed cause a processing device to:
detect, by the processing device, a touch on a touch screen display;
receive a first signal indicating a start of the touch;
start a timer in response to the first signal;
monitor, by the processing device, a length of the touch as the touch continues on the touch screen display;
determine a current time period covering the length of the touch using a current value of the timer, the current time period comprising one of a plurality of time periods, wherein each of the plurality of time periods corresponds to one of a plurality of functions;
identify, by the processing device, a current function, of the plurality of functions, corresponding to the current time period, wherein a number of the plurality of time periods, lengths of the plurality of time periods, the plurality of functions, and which of the plurality of functions corresponds to each of the plurality of time periods are customizable through a user interface provided on the touch screen display;
receive a second signal indicating an end of the touch;
stop the timer at a final value in response to the second signal;
determine a final time period using the final value of the timer;
identify a final function, of the plurality of functions, corresponding to the final time period; and
cause the processing device to implement the final function.

13. The storage medium of claim 12, wherein to determine monitor the length of the touch the instructions to cause the processing device to measure, by the timer, a period of time between the start of the touch and the end of the touch.

14. The storage medium of claim 12, wherein to determine the current time period and the final time period the instructions to cause the processing device to utilize a command table storing one or more time period values.

15. The storage medium of claim 14, wherein the operations instructions to cause the processing device further to:
identify a function corresponding to the length of the touch by utilizing the command table storing one or more functions corresponding to the one or more time period values corresponding to the plurality of time periods.

16. The storage medium of claim 12, wherein the operations instructions to cause the processing device further to:
    display, on the touch screen display, an indication of the current function corresponding to the current time period, wherein the current time period comprises a time between the start of the touch and the current time.

17. The storage medium of claim 12, wherein the operations instructions to cause the processing device further to:
    update the displayed indication to indicate a function corresponding to a subsequent time period when the time between the start of the touch and the current time reaches the subsequent time period.

\* \* \* \* \*